(12) United States Patent
Salle et al.

(10) Patent No.: US 9,576,450 B2
(45) Date of Patent: *Feb. 21, 2017

(54) SECURITY WRAP WITH BREAKABLE CONDUCTORS

(71) Applicant: Johnson Electric S.A., Murten (CH)

(72) Inventors: Vincent Daniel Jean Salle, Cowes (GB); Dominic John Ward, Carisbrooke (GB); Martin Wallace Edmonds, East Cowes (GB); Libing Zhang, Sharon, MA (US)

(73) Assignee: JOHNSON ELECTRIC S.A., Murten (CH)

( * ) Notice: Subject to any disclaimer, the term of this patent is extended or adjusted under 35 U.S.C. 154(b) by 759 days.

This patent is subject to a terminal disclaimer.

(21) Appl. No.: 13/952,203

(22) Filed: Jul. 26, 2013

(65) Prior Publication Data

US 2014/0028335 A1    Jan. 30, 2014

(30) Foreign Application Priority Data

Jul. 27, 2012   (GB) .................................. 1213442.5

(51) Int. Cl.
*G08B 13/12* (2006.01)
*G06F 21/87* (2013.01)
*H05K 1/02* (2006.01)

(52) U.S. Cl.
CPC ............ *G08B 13/12* (2013.01); *G06F 21/87* (2013.01); *H05K 1/0275* (2013.01); *G08B 13/128* (2013.01); *H05K 2201/09263* (2013.01)

(58) Field of Classification Search
None
See application file for complete search history.

(56) References Cited

U.S. PATENT DOCUMENTS

| 6,421,013 | B1* | 7/2002 | Chung ............ G06K 19/07749 235/441 |
| 7,065,656 | B2* | 6/2006 | Schwenck .............. G06F 21/87 713/194 |
| 2004/0212017 | A1 | 10/2004 | Mizuno et al. |
| 2006/0259788 | A1 | 11/2006 | Elbert et al. |
| 2008/0106400 | A1* | 5/2008 | Hunter .................... G06F 21/87 340/540 |
| 2008/0251905 | A1* | 10/2008 | Pope ................. H01L 23/49816 257/679 |
| 2008/0259788 | A1 | 10/2008 | Wang et al. |
| 2010/0328113 | A1* | 12/2010 | Henry .................... G06F 21/86 341/24 |

FOREIGN PATENT DOCUMENTS

| JP | H10133582 (A) |   | 5/1998 |
| JP | 2002049317 A | * | 2/2002 |
| JP | 2002049317 (A) |   | 2/2002 |

* cited by examiner

*Primary Examiner* — Mohamed Barakat
(74) *Attorney, Agent, or Firm* — Muncy, Geissler, Olds & Lowe PC (57) ABSTRACT

A security wrap (20) for protecting an electronic component includes a substrate (22) having a first side and a second side opposite to each other. A security screen (26) is disposed over the first side of the substrate (22) and includes a pair of screen terminals (48) and a frangible and electrically conductive path (46) between the pair of screen terminals (48). A layer of adhesive (30) is over the first side of the substrate (22) and bonds the first side of the substrate (22) to the electronic component with the security screen (26) sandwiched there between.

18 Claims, 11 Drawing Sheets

SECURITY WRAP WITH BREAKABLE CONDUCTORS

CROSS REFERENCE TO RELATED APPLICATIONS

This non-provisional patent application claims priority under 35 U.S.C. §119(a) from Patent Application No. 1213442.5 filed in United Kingdom on Jul. 27, 2012.

FIELD OF THE INVENTION

This invention relates to a tamper detection device and in particular to a flexible security wrap for an electronic circuit used to detect invasive tampering.

Although this invention will be described in relation to security wraps as an example of the invention, the invention can be used with any printed electronics (PE) flex requiring a need for detection of removal or tampering.

BACKGROUND OF THE INVENTION

Currently, security wraps form a solid security screen masking an area of the electronics to be protected. Removal of the security wrap is physically difficult due to the manner in which the security wrap is attached to the device, usually by gluing, soldering or encapsulation with a resin material. However, they offer little in the way of tamper resistance or indication of tampering except by visual inspection. Some systems have an alarm circuit which may disable the device or simply give a visual indication that the security wrap has been removed, but there is no detection of an attempt to remove or bypass the security wrap by drilling a hole through it or simply lifting up a corner of the wrap.

In addition, coating with resins or encapsulating the security wrap creates a heavier and thicker construction whilst industry is striving to develop thinner and lighter devices to maximize internal space for more components to add greater functionality into portable electronic devices such as point of sale (POS) terminals and other applications and/or to make the devices smaller and lighter.

Further, for some devices, such as credit card readers, there is a need to operate pre-assembled components of the device, for example curved metal discs known as metal domes for keypad buttons and so it is not feasible to encapsulate or coat the security wrap with resins. Resins create a hard shell that prevents the mechanical operation or tactile feedback of such components. The resin typically forms a permanent coating such that repair of the PCB or components is no longer possible.

Hence there is a desire for a security device that, in conjunction with a adhesive, summarily breaks or damages a conductive circuit, forming part of a security screen, thereby affecting an electrical state change to initiate an alarm, when removal is attempted.

SUMMARY OF THE INVENTION

In one aspect thereof, the present invention provides a security wrap for protecting an electronic component, comprising: a substrate having a first side and a second side opposite to each other; a security screen disposed over the first side of said substrate and including a pair of screen terminals and a frangible and electrically conductive path between the pair of screen terminals; and a layer of adhesive over the first side of said substrate and bonding the first side of said substrate to the electronic component with said security screen sandwiched there between.

Preferably, said security screen is formed from a conductive ink in a printing process.

Preferably, said layer of adhesive includes a layer of pressure sensitive adhesive.

Preferably, said layer of adhesive includes a layer of thermoset adhesive.

Preferably, further comprising a release layer having a predetermined pattern of release ink disposed between the first side of said substrate and said security screen to selectively modify an adhesion between said security screen and said substrate.

Preferably, said layer of adhesive has a first bonding strength between said security screen and the electronic component; and said release layer has a second bonding strength between said security screen and said substrate less than the first bonding strength.

Preferably, the component has an alarm circuit coupled to the pair of screen terminals of said security screen.

Preferably, the alarm circuit of the component is sensitive to a change of resistance in the frangible and electrically conductive path of said security screen.

Preferably, said security screen includes the frangible and electrically conductive path formed by conductive ink printed on said substrate.

Preferably, the frangible and electrically conductive path of said security screen has a width between one micrometer and one millimeter; and a space between different potions of the frangible and electrically conductive path of said security screen is between one micrometer and one millimeter.

Preferably, said security screen disposed over the first side of said substrate and includes a plural pairs of screen terminals and a plurality of frangible and electrically conductive paths, each frangible and electrically conductive path being coupled between a corresponding pair of screen terminals.

Preferably, further comprising: a dielectric layer disposed between said security screen and the first side of said substrate; and a second security screen disposed between said dielectric layer and the first side of said substrate and including a second pair of screen terminals and a second frangible and electrically conductive path between the second pair of screen terminals.

Preferably, the dielectric layer is a printed layer applied to the second security screen.

Preferably, the frangible and electrically conductive path of said security screen and the second frangible and electrically conductive path of said second security screen are connected in series with each other.

Preferably, further comprising: a second security screen disposed over the second side of said substrate and including a second pair of screen terminals and a second frangible and electrically conductive path coupled between the second pair of screen terminals; and a dielectric layer disposed over said second security screen.

Preferably, the frangible and electrically conductive path is bonded to the first side of the substrate, and the area of the first side of the substrate bonding to the frangible and electrically conductive path has a different surface energy with the remaining area of the first side of the substrate.

Preferably, the layer of adhesive has a through hole completely filled with conductive material for connecting the frangible and electrically conductive path to the electronic component.

Preferably, the substrate is a folded to form an open sided box arranged to accommodate the electronic component.

Preferably, the substrate has an embossed portion preformed by plastic deformation for receiving the electronic component.

In another aspect thereof, the present invention provides a security wrap for preventing unauthorized access to a device having an alarm circuit and components mounted on a printed circuit board (PCB), comprising: a substrate having a first side and a second side opposite to each other; a release layer having a predetermined pattern of release ink disposed over the first side of said substrate; a security screen disposed over said release layer and the first side of said substrate and including a pair of screen terminals coupled to the alarm circuit of the device and a conductive track between the pair of screen terminals; and a layer of adhesive covering the first said substrate and bonding the first side of said substrate to the PCB of the device with said security screen and said release layer sandwiched there between.

Preferably, further comprising: a dielectric layer disposed between said security screen and said release layer over the first side of said substrate; and a second security screen disposed between said dielectric layer and said release layer over the first side of said substrate and including a second pair of screen terminals coupled to the alarm circuit of the device and a second conductive track between the second pair of screen terminals.

Preferably, the conductive track of said security screen and the second conductive track of said second security screen are connected to each other in series.

Preferably, the conductive track of said security screen has a width between 200 micrometer and 300 micrometer; and a space between different potions of the conductive track of said security screen is between 200 micrometer and 300 micrometer.

Preferably, the conductive track of said security screen has a predetermined resistance; and the alarm circuit in the device is configured to be sensitive to a change in resistance.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
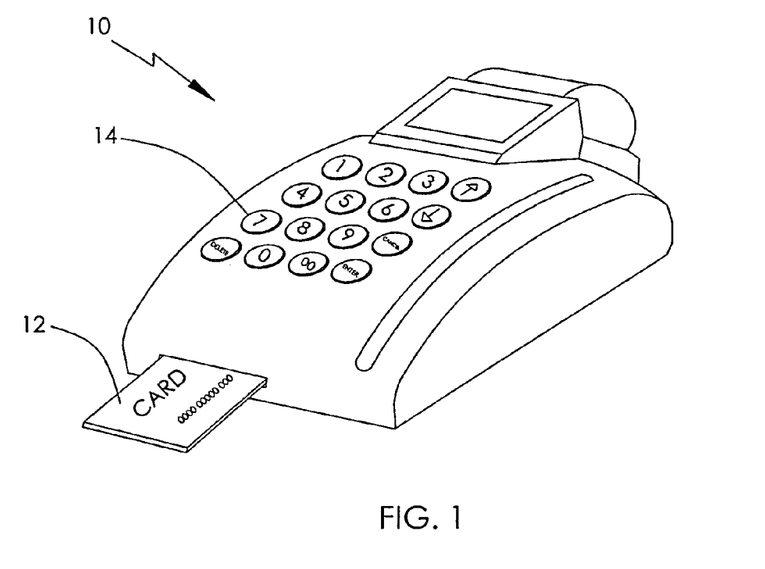
FIG. 1 illustrates a point of sale (POS) device as an example of a device which uses a security wrap.

FIG. 1 illustrates a POS device 10 as an example of where the security wrap is used. The POS has a slot for receiving a card 12, such as a credit card containing confidential information such as account details, etc. The device 10 also has buttons 14 for entering instructions for controlling the device. Inside the PUS 10 is an electronic circuit comprising circuit board with a memory chip and/or a microprocessor which may contain or momentarily access confidential information. The security wrap 20 may be placed over the entire circuit board or over just a portion of the board, as will be described herein after, depending on system requirements.

Figure 2:
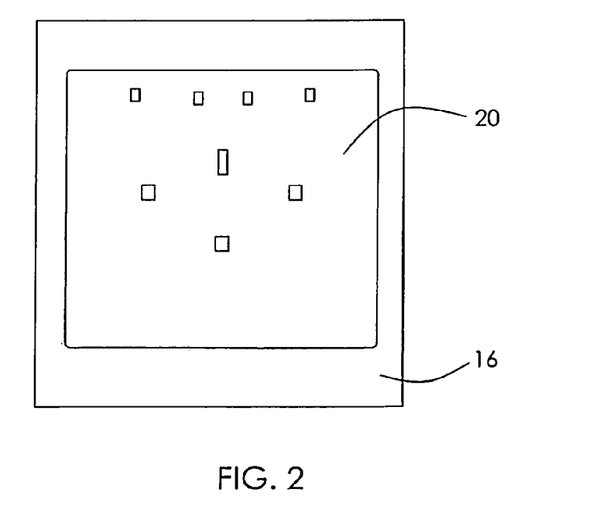
FIG. 2 illustrates the security wrap fitted to a PCB of the device of FIG. 1.
Figure 3:
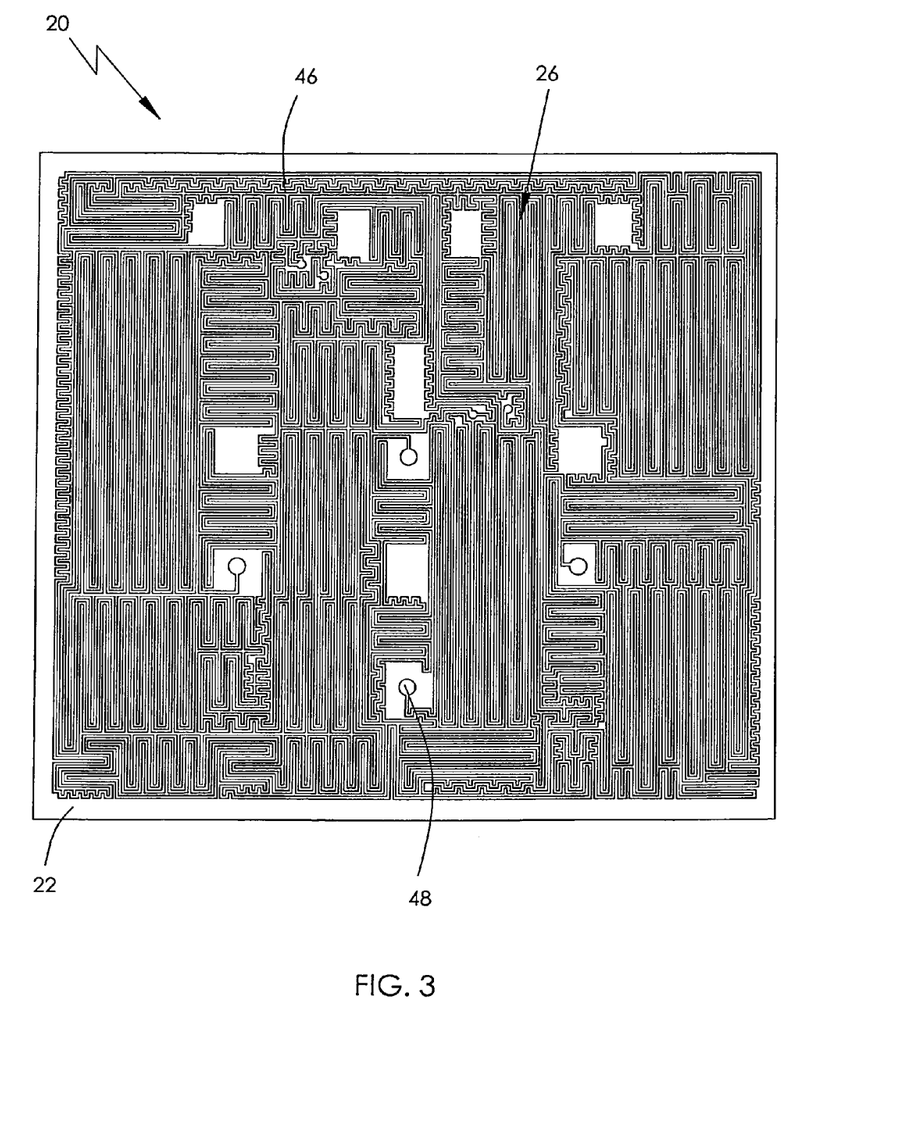
FIG. 3 is a view of the security wrap of FIG. 2, ready to be fitted to a parent device, such as the PCB of FIG. 2.

FIG. 2 shows the security wrap 20 as an open face version covering a large portion of the PCB 16 of the POS device. The PCB 16 forms a parent device to be protected and the security wrap 20 is bonded to the PCB 16. The reverse side of the security wrap 20 is shown in FIG. 3 which illustrates the complete security wrap of FIG. 2 ready to be assembled to a parent device. The conductors or conductive traces 46 (also referred to as conductive path) and screen terminals 48 of the security screen 20 are visible due to the use of a transparent adhesive layer.

Figure 4:
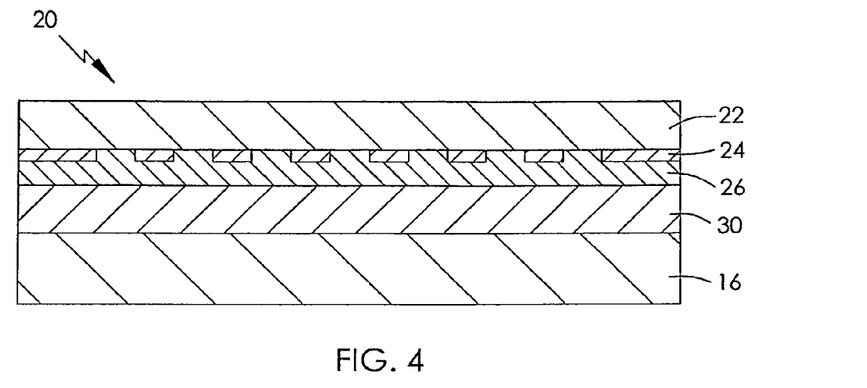
FIG. 4 is a is a sectional view of security wrap according to a first preferred embodiment, assembled to parent device.

FIG. 4 is a sectional view of a portion of a security wrap 20 according to a preferred embodiment of the present invention. This embodiment is a single conductive layer construction of either an open or full face security wrap 20 assembled to a parent device 16.

The main components of the security wrap 20 are a flexible substrate 22, a release layer 24, a conductive layer known as a security screen 26, a dielectric layer 28 (shown in FIG. 5) and an adhesive layer 30.

The substrate 22 is a polymer film, typically a polyethylene terephthalate (PET or commonly referred to as polyester) film, that provides a base for a security wrap flexible circuit. Optionally the substrate 22 is flexible, being a film of thickness between 25 μm and 175 μm but can be greater depending on functional requirements and may include other variants of polymer film including, but not limited to, polycarbonate, PEN, polyimide, PVC. The substrate 22 may be clear or opaque and pigmented, for example black or white.

The release layer 24 is preferably, an ultra-violet (UV), infra-red (IR) or thermally cured ink used to provide an adhesion between the substrate 22 and the security screen 26. The ink is thus an adhesion modifier. The release layer 24 is intermittent and applied to the substrate 22 in a predetermined pattern by a printing process and is not a complete layer such that there are areas of substrate 22 which are not covered by the adhesion modifier ink 24. Optionally, the pattern of the release layer 24 is simple stripes or dots.

The security screen 26 is preferably a pattern of one or more conductors 46 formed by thermoset or thermoplastic conductive ink printed over the substrate 22 and releasable layer 24, in variable trace widths and serpentine mesh patterns forming an electrically conductive path between a pair of screen terminals 48. A single layer security screen may have one, two or more conductors interconnecting respective pairs of screen terminals. A thermoset conductive ink is preferred for applications requiring a stable resistance between the screen terminals.

The conductive ink may be silver, carbon (or a combination of both), clear conductive polymer or other conductive or resistive inks, each with specific properties that suit the necessary requirement for the operation and functionality of the security wrap circuit. Multiple layers can be printed in total isolation or connected at specific points depending on the intended functionality of the security wrap flexible circuit.

To make an effective anti-tamper flex wrap, a stable circuit resistance against environmental stressing is critical, with which a stable baseline is achieved for monitoring the electrical signals against tampering. It is desirable to control the resistance variation within +/−10% against temperature and/or humidity. A typical testing condition is 85° C./85% Relative Humidity for 96 hours.

In accordance with the present invention, it is preferred to use a thermoset conductor to achieve the stable circuit resistance. Thermoset conductors include cross-linked conductive epoxy, conductive composites and conductive polymers. Thermoset conductors typically are composed of particulate electrically conductive material such as silver, copper, carbon, silver-coated copper, silver-coated aluminium, coated mica, glass spheres or mixtures thereof. With these thermoset materials, the formed security wrap is resistant to solvent attack and thermal tampering.

Figure 5:
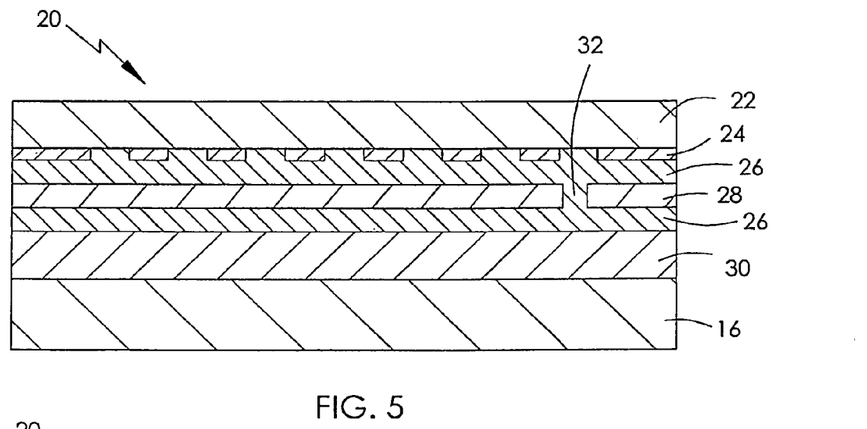
FIG. 5 is a sectional view of a security wrap according to a second embodiment, assembled to a parent device.
Figure 6:
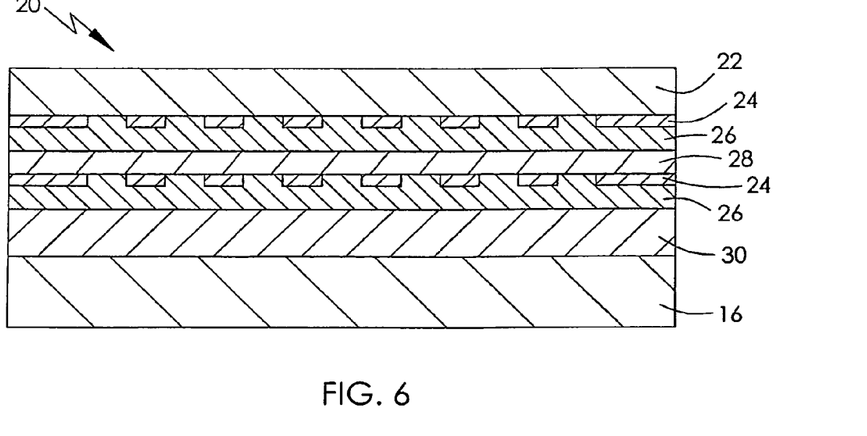
FIG. 6 is a sectional view of a security wrap according to a third embodiment, assembled to a parent device.

Referring to FIGS. 5 and 6, the dielectric layer 28 is preferably, a UV curable ink system with electrically insulative properties and is used as a separating medium to permit multiple layers of conductive ink or multiple security screens 26 to be printed on a single substrate 22. For example, the dielectric layer 28 may be applied directly over a first security screen 26 by a printing process to insulate the first security screen from a second security screen or from other conductive circuit components, either of the security wrap 20 or the parent device. The dielectric layer 28 is not necessary in a security wrap 20 having a single conductive layer 26, such as the first embodiment of FIG. 4.

Depending on security wrap functionality, the dielectric layer 28 can be printed partially or fully over the top of a conductive trace pattern 46 of a security screen 26 to enable a subsequent conductive layer 26 to be printed but remain electrically isolated from the first where necessary. A number of conductive/dielectric layers 26 and 28 can be printed in succession.

The adhesive layer 30 is preferably a pressure-sensitive adhesive (PSA), typically an acrylic adhesive that forms a bond between surfaces when pressure is applied. The adhesive layer 30 is used to bond the security wrap 20 to the parent device 16. Alternatively, the adhesive maybe a liquid adhesive such as an epoxy, or moisture-cure urethane etc. is dispensed or printed between security circuit 20 and the parent device 16, which is then cured by moisture, thermal or UV energy and forms a permanent bond between circuit and PCB. This type of adhesive is not pressure sensitive, but could work under the same disclosed principle.

Depending on the material of the parent device 16 to which the security wrap 20 is adhered, a variant PSA with specific adhesion properties can be used. This can be a bespoke PSA specifically developed for a specific bonding requirement. Specifically the adhesion to the parent device 16 must be stronger than the adhesion to the substrate 22, so that on separation of the security wrap 20 from the parent device 16, the adhesive layer 30 will remain adhered to the parent device 16 in order to break the conductive traces 46 of the security screen 26.

Thus the security wrap 20 has a substrate 22 on which a security screen 26 is bonded or otherwise fixed. The security screen 26 comprises at least one conductive trace 46 forming a conductive path between a pair of screen terminals 48 arranged to be connected to an alarm circuit (not shown) of the parent device 16. The release layer 24 is a screen printable release ink coating that separates a multitude of portions of the conductive trace 46 from the substrate 22. The release layer 24 provides a differential adhesion such that an area of the conductive trace is readily removed from the substrate 22 by the pressure-sensitive adhesive when the security wrap 20 is removed from the parent device 16, whereas where the release layer 24 is not present, the conductive trace 46 remains adhered to the substrate 22, resulting in irreversible damage to the conductive trace 46 which open circuits the trace or at least significantly modifies the resistance between the corresponding pair of screen terminals 48. Thus creating an electrical state change in the conductor 46, which may be a resistance change or a complete open circuit, that can be detected by the alarm circuit of the parent device 16 and in turn initialising an alarm response which may include the deletion of secure or personal data as necessary.

FIG. 5 is a sectional view showing main components in a double conductive layer, single circuit construction of either an open or full face security wrap 20 assembled to parent device 16. The security wrap 20 has a substrate 22, a release layer 24, a first conductive layer 26, a dielectric layer 28, a second conductive layer 26 and a layer of adhesive 30 bonding the security wrap 20 to the parent device 16. The first and second conductive layers 26 may form a two layer security screen with the conductive traces of the first and second conductive layers 26 being electrically interconnected by a hole 32 in the dielectric layer 28 which is filled with conductive ink during the printing of the second conductive layer 26. Such holes 32 are known as a via. In this case it is a printed via as the connection is made using a printing process. Plated vias are also known. The first and second conductive layers 26 are connected in series to each other.

FIG. 6 is a sectional view showing main components in a double conductive layer, double circuit construction of either an open or full face security wrap 20 when assembled to parent device 16. The security wrap 20 has a substrate 22, a release layer 24, a first conductive layer 26, a dielectric layer 28, a second release layer 24, a second conductive layer 26 and a layer of adhesive 30 bonding the security wrap 20 to the parent device 16. The first and second conductive layers 26 form two separate security screens with the conductive traces of the first and second conductive layers 26 being electrically isolated by the dielectric layer 28. Suitable means for connecting the first security screen to the alarm circuit of the parent device 16 are provided which pass through the second security screen without being electrically connected.

Figure 7:
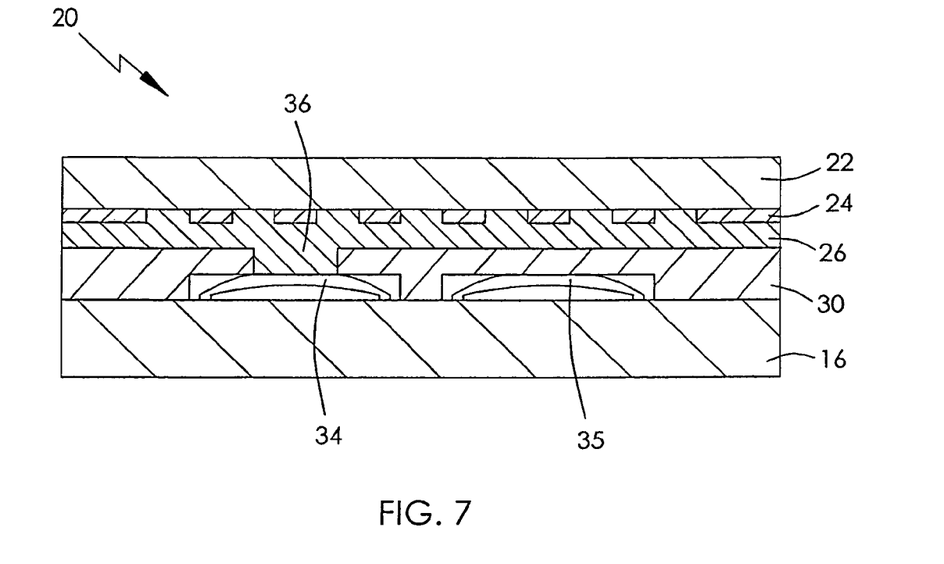
FIG. 7 is a sectional view of a security wrap similar to FIG. 1 showing use of a metal tactile dome as a connection element.

FIG. 7 is a sectional view showing main components in a single conductive layer construction of a single surface security wrap 20 utilizing a metal dome as a conductive element to connect security wrap traces to a device and where the parent device 16 surface is for example a rigid or flexible PCB. The construction of the layers is the same as described for the security wrap of FIG. 4. However, the conductive layer 26 is formed with an extension 36 which forms a screen terminal 48. The adhesive layer 30 does not cover the extension 36 and a larger void is formed below the extension 36 to accommodate a curved metal disc known as a dome 34. The dome 34 connects the screen terminal 48 to the parent device 16, in particular, to an alarm terminal in the parent device 16. A further void is shown accommodating a second dome 35 which is insulated for the conductive layer 26 by the adhesive layer 30. Dome 35 is an example of how the security wrap can be applied over switches. Dome 35 is an ancillary conductive element used to close a two pole switch on the surface of the parent device 16 which is operated by applying external downward pressure on the security wrap 20 directly above the dome 35.

Figure 8:
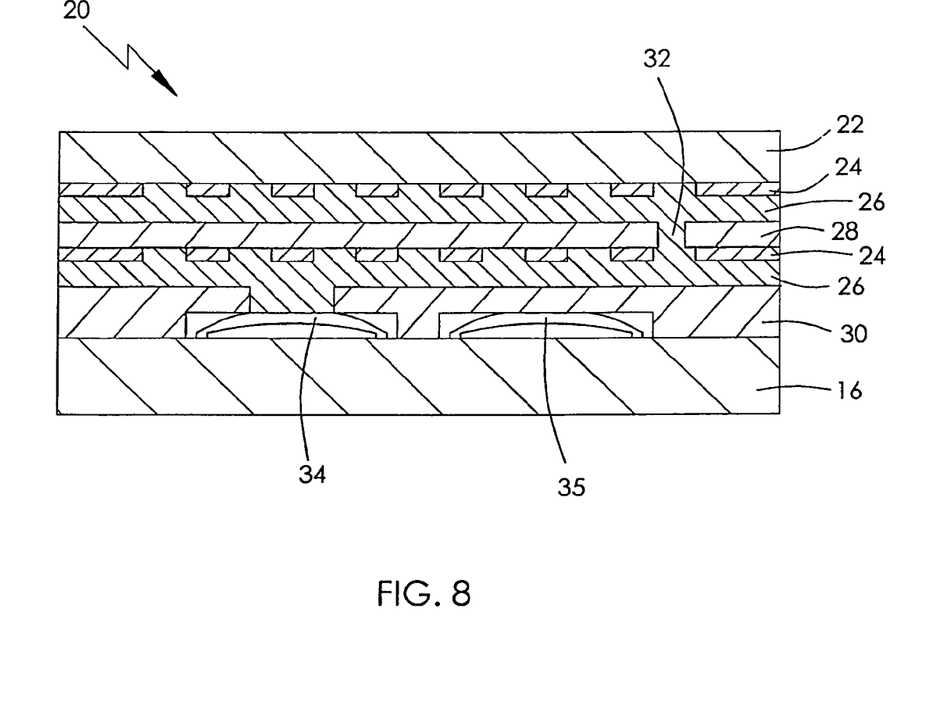
FIG. 8 is a sectional view of a security wrap similar to FIG. 3 showing use of a metal tactile dome.

FIG. 8 is a sectional view showing main components in a double conductive layer construction of a single surface security wrap 20 utilizing a metal dome 34, as a conductive element to connect security wrap traces to a device and where the parent device 16 surface is for example a rigid or flexible PCB. This drawing illustrates the addition of metal domes 34, 35 to the security wrap of FIG. 5. A similar arrangement can be made for the double conductive layer, double circuit construction of the security wrap of FIG. 6 by deletion of the vias interconnecting the conductive layers 26 and providing isolated through connections for the screen terminals.

Figure 9:
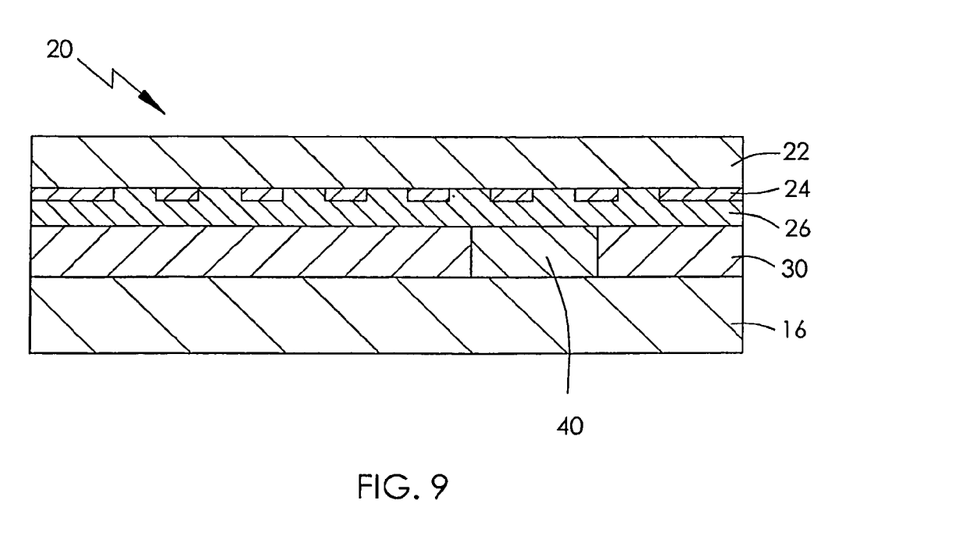
FIG. 9 is a sectional view, of a security wrap similar to FIG. 1 showing use of a conductive material member as a connection element.

FIG. 9 is a sectional view showing main components in a single conductive layer construction of a single surface security wrap 20 utilizing a conductive material to connect security wrap traces to the parent device 16 and where the surface of the parent device 16 is for example a rigid or flexible PCB. This material can include anisotropic (ACA) or isotropic (ICA) conductive adhesives 40, dependant on connection design, in resin or film form. Connection is established by means of polymerization of the adhesive or pressure applied from a protrusion of a device enclosure. The conductive material 40 replaces the metal domes 34 and the extensions 36 of the conductive layer and connects the screen terminals to the alarm circuit.

Figure 10:
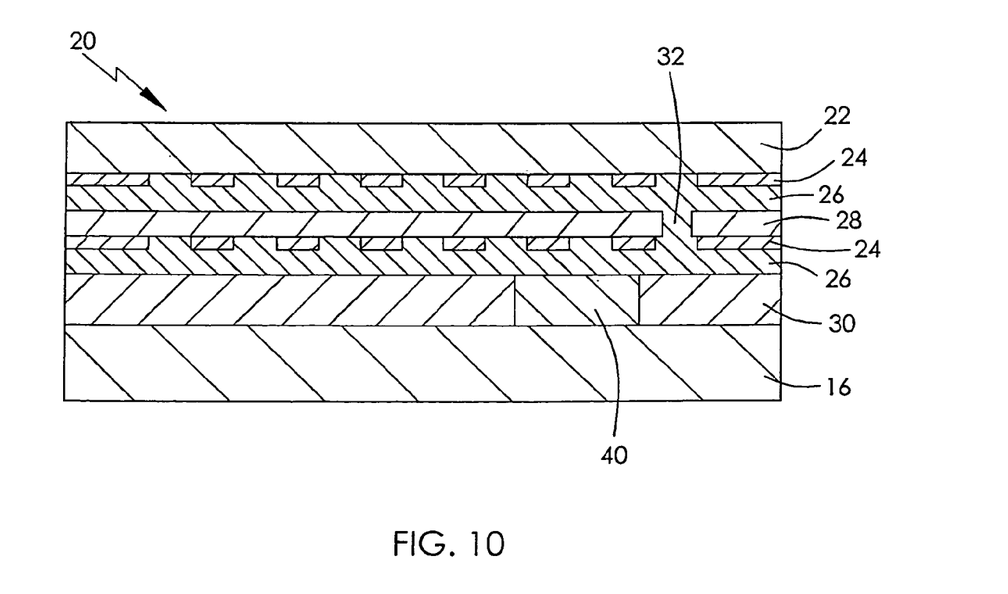
FIG. 10 is a sectional view of a security wrap similar to FIG. 3 showing use of a conductive material member as a connection element.

FIG. 10 is a sectional view showing main components in a double conductive layer construction of a single surface security wrap 20 utilizing a conductive material as described above to connect security wrap traces to a device and where the parent device 16 surface is for example a rigid or flexible PCB. A similar arrangement can be made for the double conductive layer, double circuit construction of the security wrap of FIG. 6 by deletion of the vias interconnecting the conductive layers and providing isolated through connections for the screen terminals.

Figure 11:
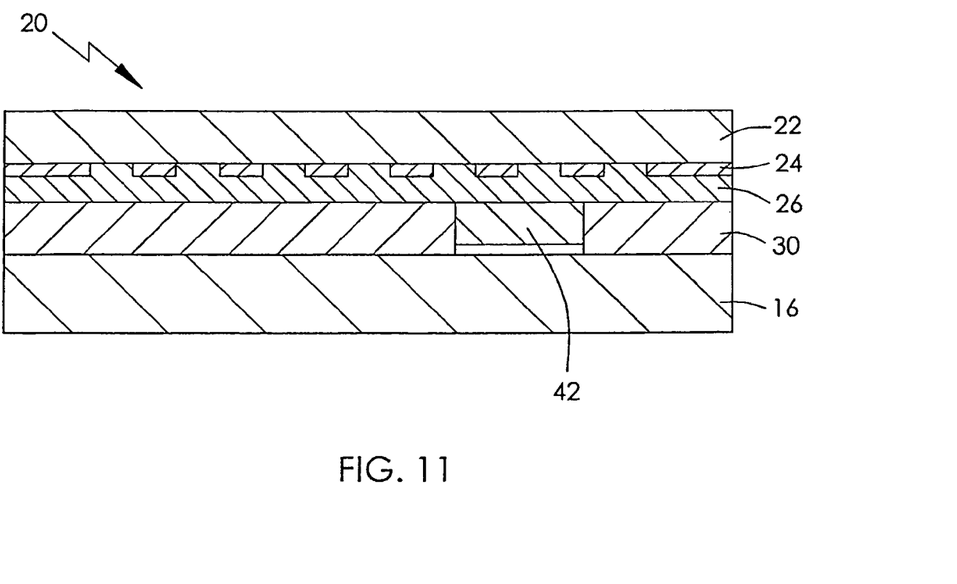
FIG. 11 is a sectional view of a security wrap similar to FIG. 1 showing use of a carbon pad as a connection element.

FIG. 11 is a sectional view showing main components in a single conductive layer construction of a single surface security wrap utilizing a printed carbon pad to connect security wrap traces to the parent device 16 and where the surface of the parent device 16 is for example a rigid or flexible PCB. The carbon pad 42 replaces the conductive material 40 used in the embodiment of FIG. 9.

Figure 12:
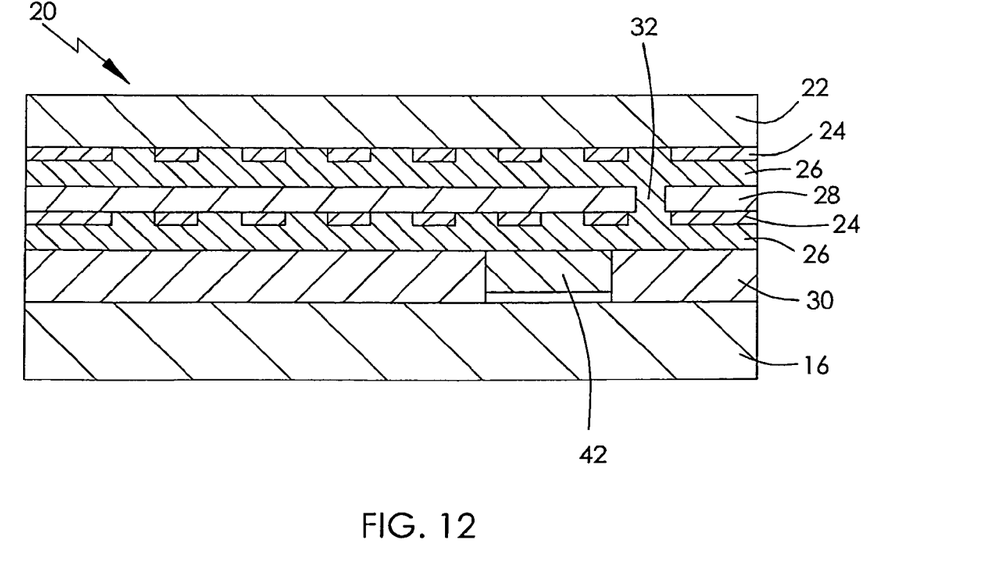
FIG. 12 is a sectional view of a security wrap similar to FIG. 4 showing use of a carbon pad as a connection element.

FIG. 12 is a sectional view showing main components in a double conductive layer construction of a single surface security wrap utilizing a printed carbon pad to connect security wrap traces to the parent device 16 and where the surface of the parent device 16 is for example a rigid or flexible PCB. The carbon pad 42 replaces the conductive material 40 used in the embodiment of FIG. 10. A similar arrangement can be made for the double conductive layer, double circuit construction of the security wrap of FIG. 6 by deletion of the vias interconnecting the conductive layers and providing isolated through connections for the screen terminals.

The carbon pads 42 preferably do not fill the void formed in the adhesive layer 30 such that, in the relaxed state, there is no direct electrical connection between the screen terminals and the alarm terminals. However, by applying a force to the security wrap 20 directly above the carbon pads 42 to resiliently deform the security wrap 20 the carbon pads 42 come into contact with the parent device 16 and electrically connect the screen terminals to the alarm terminals. Typically the carbon pad 42 connection is established by means of pressure applied from a protrusion of a device enclosure. In this way, an alarm condition is triggered by mere opening of the device enclosure before any direct attempt to remove the security wrap is made.

Figure 13:
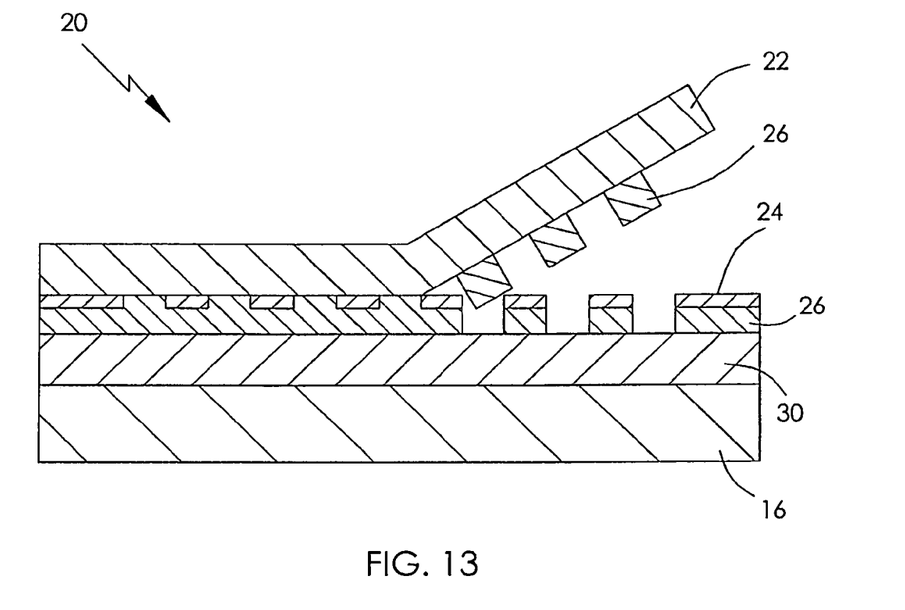
FIG. 13 is a simplified sectional view of the security wrap of FIG. 6 showing separation of a conductive layer.

FIG. 13 is a simplified sectional view showing separation of a conductive layer 26 in a single conductive layer construction. As shown, in the corner of the security wrap 20 where the substrate has been lifted, the conductive layer 26 has been torn into pieces damaging the conductor and alerting the resistance between the screen terminals. In the example shown the conductor has been completely severed in several places. Portions of the conductive trace 46 applied directly to the substrate 22 remains bonded to the substrate but portions of the conductive trace 46 applied to the release layer 24 remain bonded to the adhesive layer 30 which also remains bonded to the parent layer 16, due to the reduced strength of the bond between the release layer 24 and the substrate 22 and the lower bond strength between the adhesive layer 30 and the conductive trace 46 compared with the bond strength between the conductive trace 46 and the substrate 22.

Figure 14:
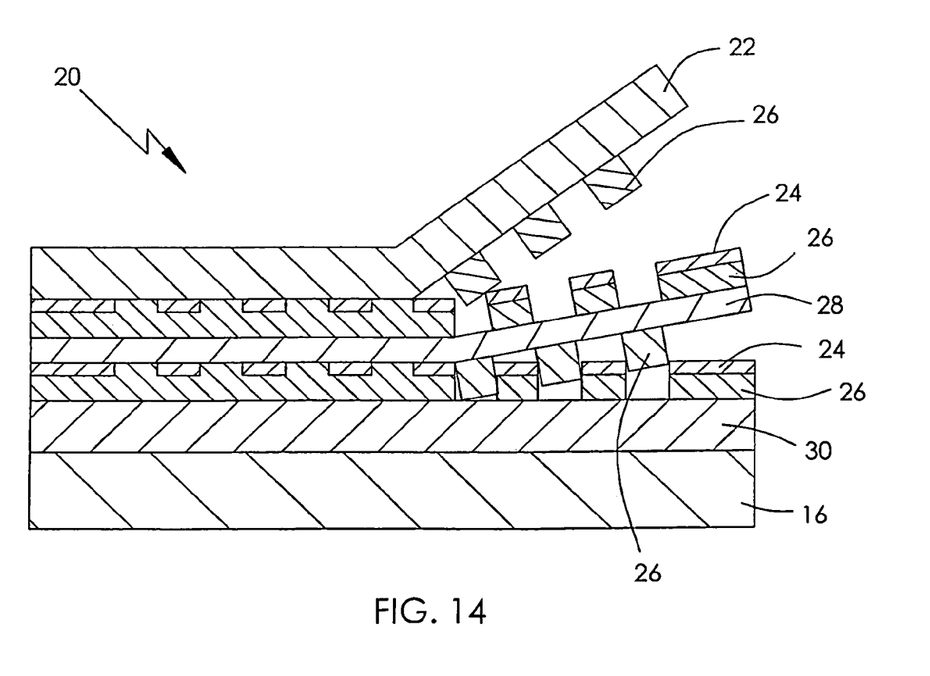
FIG. 14 is a simplified sectional view of the security wrap of FIG. 3 showing separation of a conductive layer.

FIG. 14 is a simplified sectional view showing separation of conductive layers 26 in a double conductive layer construction. This is similar to the situation shown in FIG. 13 with the additional separation occurring between the second conductive layer 26 and the dielectric layer 28, due to the reduced adhesion provided by both release layers 24 creating areas of weakened adhesion between the conductive layers and the substrate 22 or dielectric layer 28.

It should be noted that in the sectional views of FIGS. 4 to 14, the section is cut along a conductor of the security screen for convenience. It will be understood that the areas of the conductive layer 26 or security screen where there is no trace, will be filled with material or the overlaying layer, i.e. either dielectric material or adhesive material, both of which are electrically insulative.

Figure 15:
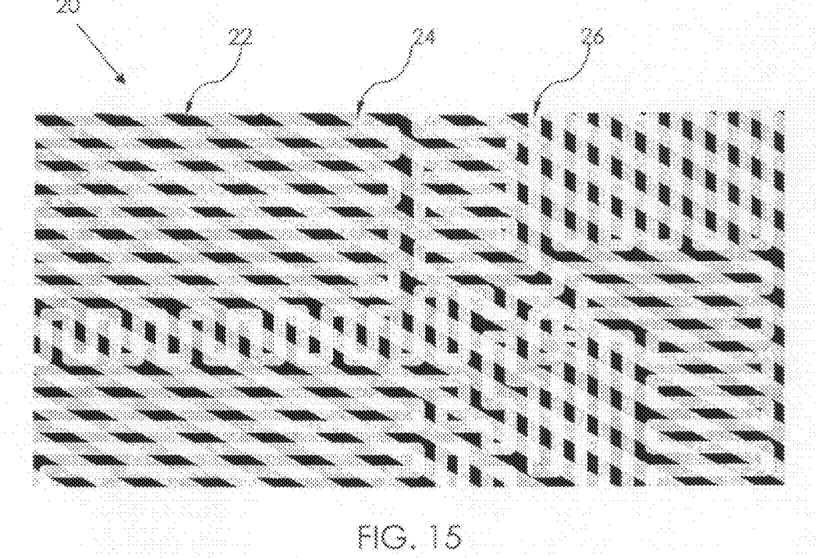
FIG. 15 is an illustration of a section of a conductive trace printed on top of an exemplary pattern of release ink.
Figure 16:
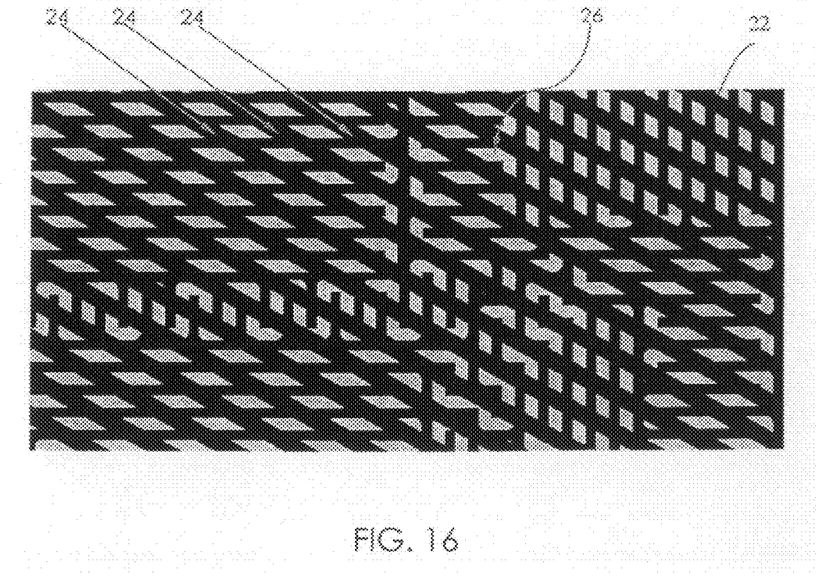
FIG. 16 is an illustration of a substrate with remaining sections of the conductive trace after separation from the parent device.

FIG. 15 is an illustration of a section of conductive traces 46 of the security screen 26 printed on top of an exemplary pattern of release ink forming the release layer 24 on the substrate 22. FIG. 16 is an illustration of a remaining section of conductive traces 46 after removal of the adhesive layer. As can be seen, the portions of the conductive traces 46 removed are those applied to the substrate 22 over the release ink of the release layer 24.

While the drawings have been enlarged for better clarity of observation and description, in the preferred embodiments, the width of the conductive traces and the spaces there between are in the range of 1 to 1,000 microns. The preferred embodiment uses a trace width between 200 and 300 microns. This produces a good compromise between costs and security level as the finer the widths the higher the security level but the more expensive is the printing process.

Figure 17:
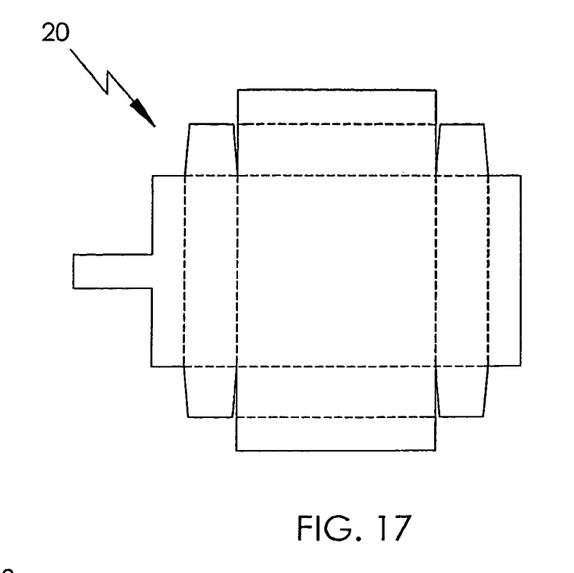
FIG. 17 is a schematic illustration showing an exemplary open face security wrap in an unwrapped form.

FIG. 17 is a schematic illustration showing exemplary open face security wrap 20 in an unwrapped form. The illustration is a plan view of the security wrap 20 where the ink layers are on the reverse side and remain hidden after assembly to a parent device 16. An open wrap is adhered around a device with a top surface and sides only.

Figure 18:
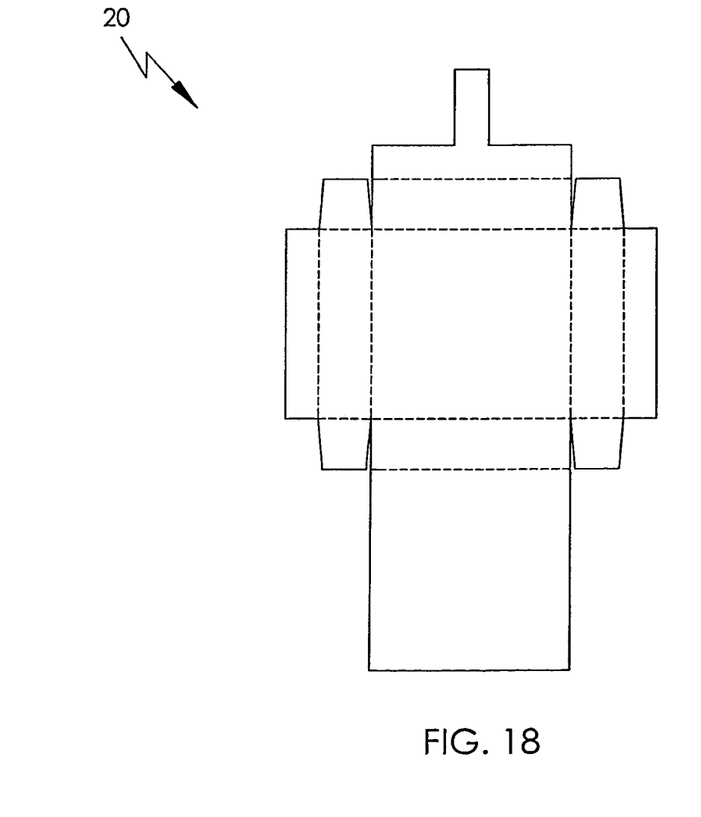
FIG. 18 is a schematic illustration showing an exemplary full face security wrap in an unwrapped form.

FIG. 18 is a schematic illustration showing an exemplary full face security wrap 20 in an unwrapped form. The illustration is a plan view of the security wrap 20 where the ink layers are on the reverse side and remain hidden after assembly to a parent device 16. A full wrap is adhered around a device with a top and bottom face and sides.

Figure 19:
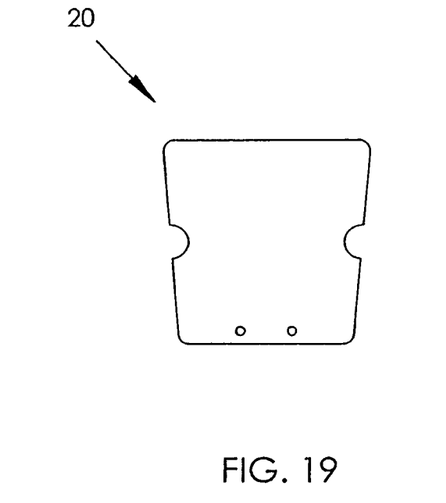
FIG. 19 is a schematic illustration showing an exemplary single surface security wrap.

FIG. 19 is a schematic illustration showing an exemplary single surface security wrap 20. The illustration is a plan view of the security wrap where the ink layers are on the reverse side and remain hidden after assembly to a parent device. A single surface wrap is adhered to just one surface which could be curved or shaped in only one axis of the wrap.

The construction of the security wrap is as follows. The release ink forming the release layer 24 is applied to the substrate 22 via a printing process such as a screen printing process. The conductive ink traces forming the conductors 46 of the security screen 26 are attached to both the substrate 22 and the release ink via screen printing methods. The attachment is significantly more permanent between the conductive ink traces 46 and the substrate 22 than between the release ink and the substrate 22 thereby producing a weak point where the conductive trace 46 is isolated from the substrate 22 by the release ink.

The adhesive layer 30 is attached to the conductive traces 46 by applied pressure. As a result of counter patterning of the release ink and conductive ink, the adhesive layer 30 is intermittently attached to conductive ink attached to the substrate 22 only, or attached to conductive ink that is attached to releasable ink, which in turn is attached to the substrate 22.

The security wrap 22 is attached to a parent device 16 in need of protection by the adhesive layer 30 using applied pressure. If removal of the security wrap 22 is attempted, the conductive ink traces 46 are damaged, thus creating a resistance change or complete open circuit at the weak points. This occurrence effectively changes the electrical state of the conductive ink trace and prompts the alarm system of the parent device 16 to initiate an alarm condition which may include erasure of confidential or personal data as necessary.

Operation of the preferred embodiment of the invention will now be described by way of an example. The release layer 24 composed of a release ink coating is screen printed onto the substrate 22, in a contrasting pattern to a subsequently screen printed conductive silver ink track pattern. The release ink pattern provides intermittent separation of the conductive ink track pattern from the substrate film. Where the conductive ink is separated from the substrate film, a differential adhesion occurs such that these sections of conductive trace have a lower adhesive bond than those sections bonded to the bare substrate film. The pressure-sensitive adhesive (PSA) is laminated over both the conductive and release ink patterns by means of a laminating roller. The security wrap 20 circuit is profile cut to a custom-made shape ready to be assembled to a security device which might be in the form of a printed circuit board, an open faced or complete plastic enclosure.

The security wrap 20 is assembled to a parent device 16 either by hand or some mechanical means dependant on the assembly process. The bond of the adhesive to the conductive ink is stronger than the bond of the release ink to the substrate film. Additionally the bond of the adhesive to the parent device 16 is required to be stronger than the bond to the security wrap substrate 22. If an attempt to remove the security wrap 20 is affected by an attacker, the sections of conductive trace printed over release ink break away with the adhesive while leaving the sections of conductive ink bonded to the substrate film in place (FIG. 16).

This creates a change in the electrical state in the printed conductor, this may be a resistive change or a complete open circuit, that can be detected by the device 16 incorporating the security wrap 20 and in turn signal the deletion of secure or personal data as necessary.

Figure 20:
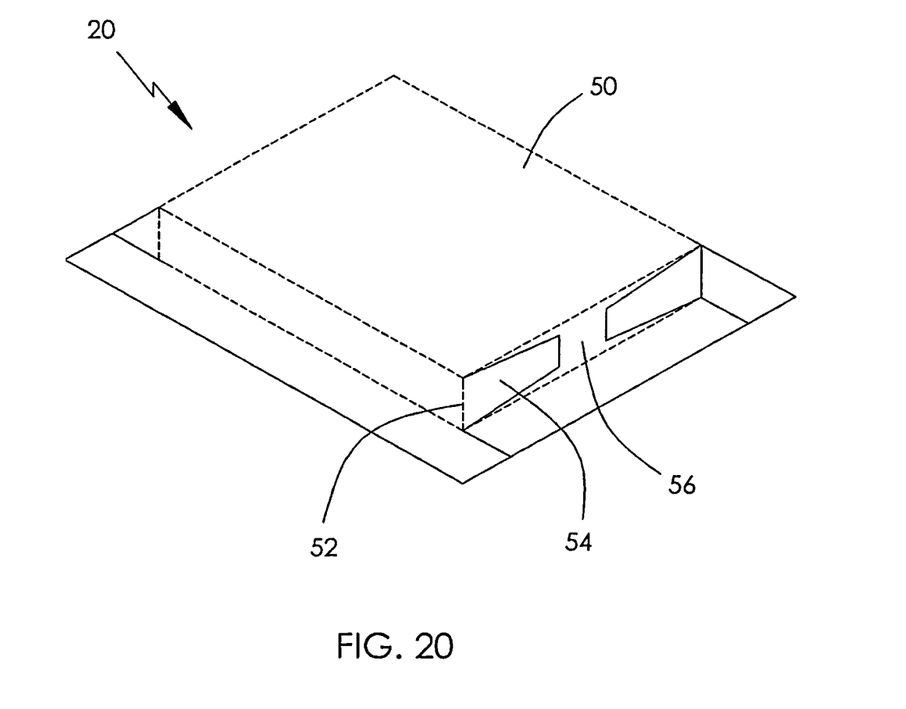
FIG. 20 illustrates a security wrap shaped like an open box.

FIG. 20 shows a single surface security wrap 20 which is folded to form an open sided box 50. The box is arranged to be closed by a surface of the parent device 16 such as the PCB and the space within the box being arranged to receive components mounted on the PCB. Vertical edges 52 of the box 50 are secured by flaps 54 supporting parts of the security screen and bonded by the adhesive layer to the side panels 56.

Figure 21:
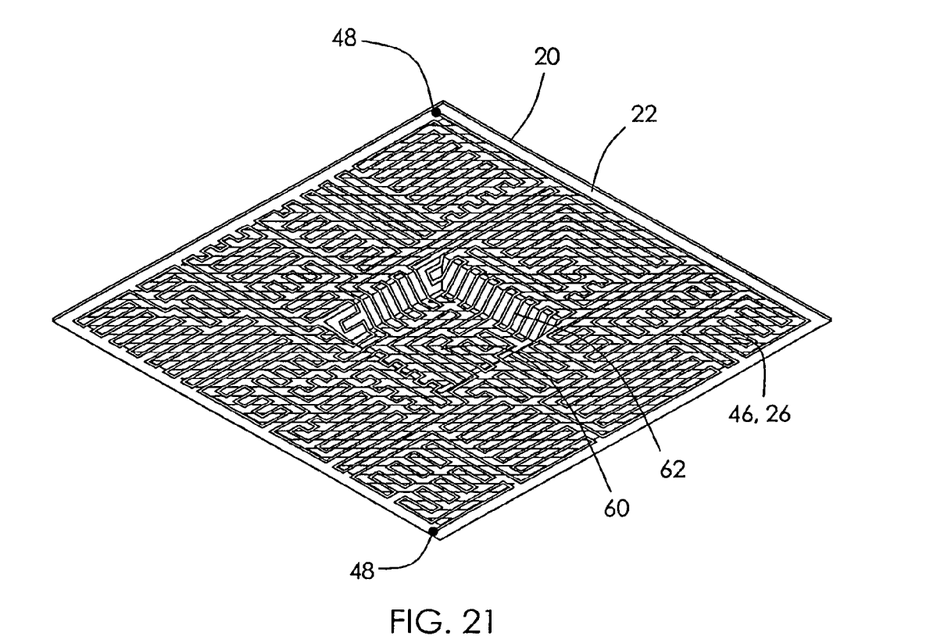
FIG. 21 illustrates an embossed security wrap.
Figure 22:
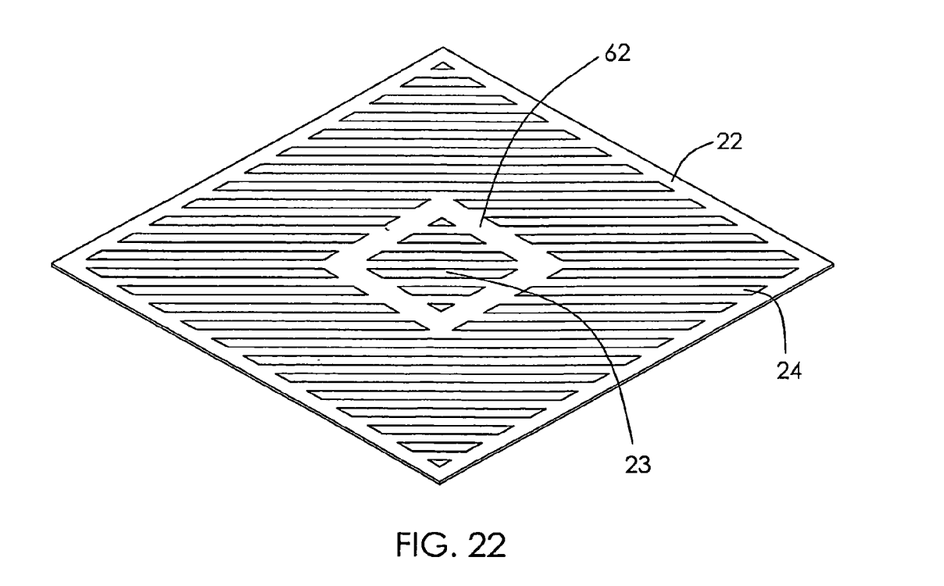
FIG. 22 illustrates a release layer applied to a substrate prior to embossing of the substrate.

FIGS. 21 and 22 relate to an embossed security wrap 20. An embossed security wrap 20 has at least one portion 60 which has been deformed to provide a compartment or space to accommodate components of the PCB. The substrate 22 has the intermittent release layer 24 formed by printing release ink on the substrate 22 in a predetermined pattern. The pattern includes a blank zone 62 which corresponds to the portion of the substrate 22 which will be deformed or stretched during the embossing process, as shown in FIG. 21. In the example shown, the release ink is applied to a portion 23 which remains flat within the embossing zone 62 and which will contact components of the PCB accommodated within the embossed portion 60. This is optional and of no value if the security wrap 22 does not make good contact with the component to enable the adhesive layer to make an effective bond.

The conductive traces 46 are printed on the substrate 22 over the release layer 24 and then the substrate 22 is plastically deformed to produce the desired shape of the substrate 22 by substantial displacement of a portion of the substrate 22. The shape of the security wrap 20 can thus be made to more closely conform to the shape of the PCB and the components there on.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

In particular, the instant embodiments illustrate one way to achieve breakable conductors by selectively changing the substrate surface energy by a physical method. The adhesion modifier can be viewed as a chemical approach to cause a physical change. Other methods of selectively, physically changing the adhesion between the substrate and the conductors may include:

(1) UV, plasma or e-beam treatment of the substrate through a preformed mask over substrate: It is known to use UV, plasma or e-beam treatment to increase plastic surface energy so adhesion of ink to plastic would be improved. A mask with openings is placed over the substrate then a UV, plasma or e-beam treatment is applied to selectively form areas with high surface energy or low surface energy. When conductor is printed onto the substrate, the adhesion would be weak on un-treated areas and high on treated areas. With adhesive applied and assembled, the conductor becomes breakable upon tampering.

(2) Laser treatment: a laser beam is scanned across the substrate to form areas with high or low surface energy. As laser machine is easily programmable, various pattern can be formed. After the laser treatment, same effect may be achieved as in (1).

(3) Surface roughening: the surface of the substrate may be selectively roughened to increase surface area which then alters the adhesion of ink to the substrate.

The invention claimed is:

1. A security wrap for protecting an electronic component, comprising:
a substrate having a first side and a second side opposite to each other;
a security screen disposed over the first side of said substrate and including a pair of screen terminals and a frangible and electrically conductive path between the pair of screen terminals;
a layer of adhesive over the first side of said substrate and bonding the first side of said substrate to the electronic component with said security screen sandwiched there between;
a dielectric layer disposed between said security screen and the first side of said substrate; and
a second security screen disposed between said dielectric layer and the first side of said substrate and including a second pair of screen terminals and a second frangible and electrically conductive path between the second pair of screen terminals.

2. The security wrap of claim 1, wherein said security screen is formed from a conductive ink in a printing process.

3. The security wrap of claim 1, wherein said layer of adhesive includes a layer of pressure sensitive adhesive.

4. The security wrap of claim 1, wherein said layer of adhesive includes a layer of thermoset adhesive.

5. The security wrap of claim 1, further comprising a release layer having a predetermined pattern of release ink disposed between the first side of said substrate and said security screen to selectively modify an adhesion between said security screen and said substrate.

6. The security wrap of claim 5, wherein:
said layer of adhesive has a first bonding strength between said security screen and the electronic component; and
said release layer has a second bonding strength between said security screen and said substrate less than the first bonding strength.

7. The security wrap of claim 1, wherein the component has an alarm circuit coupled to the pair of screen terminals of said security screen.

8. The security wrap of claim 7, wherein the alarm circuit of the component is sensitive to a change of resistance in the frangible and electrically conductive path of said security screen.

9. The security wrap of claim 1, wherein said security screen includes the frangible and electrically conductive path formed by conductive ink printed on said substrate.

10. The security wrap of claim 1, wherein:
the frangible and electrically conductive path of said security screen has a width between one micrometer and one millimeter; and
a space between different potions of the frangible and electrically conductive path of said security screen is between one micrometer and one millimeter.

11. The security wrap of claim 1, wherein said security screen disposed over the first side of said substrate and includes a plural pairs of screen terminals and a plurality of frangible and electrically conductive paths, each frangible and electrically conductive path being coupled between a corresponding pair of screen terminals.

12. The security wrap of claim 1, wherein the dielectric layer is a printed layer applied to the second security screen.

13. The security wrap of claim 1, wherein the frangible and electrically conductive path of said security screen and the second frangible and electrically conductive path of said second security screen are connected in series with each other.

14. The security wrap of claim 1, further comprising:
a second security screen disposed over the second side of said substrate and including a second pair of screen terminals and a second frangible and electrically conductive path coupled between the second pair of screen terminals; and
a dielectric layer disposed over said second security screen.

15. The security wrap of claim 1, wherein the frangible and electrically conductive path is formed on the first side of the substrate, and the area of the first side of the substrate bonding to the frangible and electrically conductive path has a different surface energy with the remaining area of the first side of the substrate.

16. The security wrap of claim 1, wherein the layer of adhesive has a through hole completely filled with conductive material for connecting the frangible and electrically conductive path to the electronic component.

17. The security wrap of claim 1, wherein the substrate is folded to form an open sided box arranged to accommodate the electronic component.

18. The security wrap of claim 1, wherein the substrate has an embossed portion preformed by plastic deformation for receiving the electronic component.

* * * * *